United States Patent
Wan et al.

(10) Patent No.: US 12,432,341 B2
(45) Date of Patent: Sep. 30, 2025

(54) METHODS FOR INTRA PREDICTION, AND ENCODER

(71) Applicant: GUANGDONG OPPO MOBILE TELECOMMUNICATIONS CORP., LTD., Guangdong (CN)

(72) Inventors: Shuai Wan, Dongguan (CN); Fuzheng Yang, Dongguan (CN); Zhecheng Wang, Dongguan (CN); Lei Wei, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 18/436,213

(22) Filed: Feb. 8, 2024

(65) Prior Publication Data
US 2024/0195953 A1    Jun. 13, 2024

Related U.S. Application Data

(63) Continuation of application No. 17/857,789, filed on Jul. 5, 2022, now Pat. No. 11,936,850, which is a
(Continued)

(51) Int. Cl.
*H04N 19/105*    (2014.01)
*H04N 19/14*    (2014.01)
(Continued)

(52) U.S. Cl.
CPC ........... *H04N 19/105* (2014.11); *H04N 19/14* (2014.11); *H04N 19/167* (2014.11); *H04N 19/184* (2014.11); *H04N 19/196* (2014.11)

(58) Field of Classification Search
CPC .... H04N 19/105; H04N 19/14; H04N 19/167; H04N 19/184; H04N 19/196;
(Continued)

(56) References Cited

U.S. PATENT DOCUMENTS

| 11,206,426 B2 | 12/2021 | Sugio |
| 11,742,878 B2 | 8/2023 | Zhang |

(Continued)

FOREIGN PATENT DOCUMENTS

| BR | 112020024052 A2 | 2/2021 | |
| CA | 3122248 A1 * | 6/2020 | ............... G06T 9/00 |

(Continued)

OTHER PUBLICATIONS

Notice of Rejection of the Japanese application No. 2022-541650, issued on Feb. 13, 2024, 6 pages with English translation.
(Continued)

*Primary Examiner* — Tracy Y. Li
(74) *Attorney, Agent, or Firm* — PERKINS COIE LLP

(57) ABSTRACT

A method for intra prediction includes: determining occupancy information of a first number of neighboring nodes of a coded node; determining occupancy information of a second number of neighboring nodes of the coded node based on a position association between at least one neighboring node of the coded node and a child node of the coded node, where the first number is greater than the second number; determining an occupancy number corresponding to the second number of neighboring nodes based on the occupancy information of the second number of neighboring nodes; and determining an occupancy prediction result of the child node of the coded node based on the occupancy number. A decoder and a method for intra prediction performed by the decoder are also provided.

11 Claims, 12 Drawing Sheets

Related U.S. Application Data continuation of application No. PCT/CN2020/070557, filed on Jan. 6, 2020.

(51) Int. Cl.
 *H04N 19/167* (2014.01)
 *H04N 19/184* (2014.01)
 *H04N 19/196* (2014.01)

(58) Field of Classification Search
 CPC .... H04N 19/96; H04N 19/597; H04N 19/593; H04N 19/124; H04N 19/13; H04N 19/30; H04N 19/42; H04N 19/44; G06T 9/40
 See application file for complete search history.

(56) References Cited

U.S. PATENT DOCUMENTS

| | | | |
|---|---|---|---|
| 2019/0080483 A1* | 3/2019 | Mammou | ............. G06T 3/4007 |
| 2020/0137399 A1 | 4/2020 | Li | |
| 2021/0099697 A1 | 4/2021 | Sugio | |
| 2021/0217206 A1 | 7/2021 | Flynn | |
| 2021/0272324 A1 | 9/2021 | Lasserre | |
| 2022/0159310 A1 | 5/2022 | Oh | |
| 2022/0159312 A1 | 5/2022 | Oh | |
| 2022/0247427 A1 | 8/2022 | Zhang | |
| 2022/0286713 A1 | 9/2022 | Oh | |
| 2022/0345695 A1 | 10/2022 | Wan | |
| 2022/0383552 A1* | 12/2022 | Hur | ......................... G06T 9/004 |
| 2022/0417557 A1* | 12/2022 | Oh | ......................... H04N 19/96 |

FOREIGN PATENT DOCUMENTS

| | | | | |
|---|---|---|---|---|
| CN | 110418135 A | | 11/2019 | |
| EP | 3514967 A1 | | 7/2019 | |
| EP | 3595180 A1 | * | 1/2020 | ............. G06F 1/03 |
| EP | 3595181 A1 | | 1/2020 | |
| EP | 3800886 A1 | | 4/2021 | |
| IN | DELNP/2013/10077 A | | 1/2015 | |
| KR | 102690197 B1 | * | 10/2019 | ............. H04N 19/96 |
| WO | 2019070952 A1 | | 4/2019 | |
| WO | 2019079397 A1 | | 4/2019 | |
| WO | 2019195920 A1 | | 10/2019 | |
| WO | 2019213986 A1 | | 11/2019 | |
| WO | 2020004461 A1 | | 1/2020 | |

OTHER PUBLICATIONS

First Office Action of the European application No. 20911782.9, issued on Mar. 1, 2024, 7 pages.
First Office Action of the Indonesian application No. P00202208299, issued on Mar. 25, 2024, 3 pages with English translation.
Non-Final Office Action of the U.S. Appl. No. 17/857,789, issued on Jan. 10, 2023, 281 pages.
Final Office Action of the U.S. Appl. No. 17/857,789, issued on Apr. 21, 2023, 14 pages.
Advisory Action of the U.S. Appl. No. 17/857,789, issued on Jul. 5, 2023, 5 pages.
Notice of Allowance of the U.S. Appl. No. 17/857,789, issued on Nov. 8, 2023, 21 pages.
Correction of Notice of Allowance of the U.S. Appl. No. 17/857,789, issued on Jan. 22, 2024, 8 pages.
International Search Report in the international application No. PCT/CN2020/080965, mailed on Dec. 28, 2020. 7 pages with English translation.
English translation of the Written Opinion of the International Search Authority in the international application No. PCT/CN2020/080965, mailed on Dec. 28, 2020. 7 pages with English translation.
Ruwen Schnabel and Reinhard Klein, "Octree-based point cloud compression"Eurographics Symposium on Point-Based Graphics (2006), M. Botsch, B. Chen (Editors), https://diglib.eg.org/xmlui/bitstream/handle/10.2312/SPBG.SPBG06.111-120/111-120.pdf?sequence=1. 11 pages.
Non-Final Office Action of the U.S. Appl. No. 17/950,860, issued on Feb. 14, 2023. 24 pages.
Final Office Action of the U.S. Appl. No. 17/950,860, issued on Jul. 11, 2023. 18 pages.
"Chi Wang (Panasonic) et al:"PCC Simplification of neighbour-dependent entropy coding in CE3.4, 122. MPEG Meeting;Apr. 16, 2018-Apr. 20, 2018; San Diego; (Motion Picture Expertgroup or ISO/IEC JTC1 /SC29/ WG11 ), No. m42689 Apr. 13, 2018(Apr. 13, 2018), XP030261656, abstract; figures 1-5, sections 1-5, 7 pages.
Zink Michael et al: "Using neighbouring nodes for the compression of octrees representing the geometry of point clouds", Proceedings of the 10th ACM Multimedia Systems Conference, Jun. 18, 2019 (Jun. 18, 2019), pp. 145-153, XP055870050, section 6, 9 pages.
Lasserre (Blackberry) S et al: "[PCC] An overview of OBUF and neighbour usage for geometry coding", 125. MPEG Meeting; Jan. 14, 2019-Jan. 18, 2019; Marrakech (Motion Picture Expert Group or ISO/IEC JTC1/ sc29/wg11), No. m458113 Jan. 2019 (Jan. 3, 2019), XP030198272, section 6, 15 pages.
"G-PCC codec description v4", 127. MPEG Meeting; Jul. 8, 2019-Jul. 12, 2019; Gothenburg; (Motion Picture Expert Group or ISO/IEC JTC1/SC29/WG11), No. N18673, Sep. 6, 2019 (Sep. 6, 2019), XP030206833, sections 3.2.2.6 and 3.2.3, 62 pages.
Supplementary European Search Report in the European application No. 20911782.9, mailed on Aug. 4, 2023, 10 pages.
"Khaled Mammou, Philip A. Chou, David Flynn, Maja Krivokuca, Ohji Nakagami and Toshiyasu Sugio, "G-PCC codec description v2, ISO/IEC JTC1/SC29/WG11 N18189, ISO/IEC JTC1/SC29/WG11, Jan. 2019, 13 pages.
First Office Action of the Japanese application No. 2022-541650, issued on Oct. 17, 2023, 10 pages with English translation.
Wei, Honglian et al. "Enhanced Intra Prediction Scheme in Point Cloud Attribute Compression" IEEE, Dec. 31, 2019 (Dec. 31, 2019), entire document.
Dricot, Antonie et al."Hybrid Octree-Plane Point Cloud Geometry Coding" IEEE, Dec. 31, 2019 (Dec. 31, 2019), entire document.
Dricot, Antoine et al. "Adaptive Multi-level Triangle Soup for Geometry-based Point Cloud Coding" IEEE, Dec. 31, 2019 (Dec. 31, 2019), entire document.
International Search Report in the international application No. PCT/CN2020/070557, mailed on Sep. 30, 2020.
English translation of the Written Opinion of the International Search Authority in the international application No. PCT/CN2020/070557, mailed on Sep. 30, 2020.
First Office Action of the Japanese application No. 2022-557779, issued on May 7, 2024, 6 pages with English translation.
3DG, "Description of Core Experiment 13.11 for G-PCC:on Intra Occupancy Prediction", ISO/IEC JTC 1/SC 29/WG 11 N19147, Jan. 31, 2020, the whole document, 3 pages.
First Office Action of the Taiwanese application No. 110109412, issued on May 29, 2024, 11 pages with English translation.
Second Office Action of the Indonesian application No. P00202208299, issued on Jul. 19, 2024, 3 pages with English translation.
Sébastien Lasserre, David Flynn, "[PCC) Neighbour-dependent entropy coding of occupancy patterns in TMC3", ISO/ IEC JTCI/SC29/WGII MPEG2018/m42238, Jan. 2018, Gwangju, Korea, the whole document, 11 pages.
Notice of Allowance of the U.S. Appl. No. 17/950,860 issued on Oct. 25, 2023, 26 pages.
Correction Notice of Allowance of the U.S. Appl. No. 17/950,860 issued on Nov. 14, 2023, 3 pages.
Shuai Wan et al: "[G-PCC] [ New proposal] On geometry occupancy intra prediction", 129. MPEG Meeting; Jan. 13, 2020-Jan. 17, 2020;Brussels; (Motion Picture Expert Group or IsO/IEC JtC1/sc29/wG11), No. m5232711 Jan. 2020 (Jan. 11, 2020), XP030224955,[ retrieved on Jan. 11, 2020], sections 1 and 2, 4 pages.
"G-PCC codec description v5", 128. MPEG Meeting; Oct. 7, 2019-Oct. 11, 2019; Geneva; (Motion Picture Expert Group or IsO/IEC JtC1/sc29/wG11). No. n18891, Dec. 18, 2019 (Dec. 18, 2019), XP030225589, [ retrieved on Dec. 18, 2019], section 3.2.3-3.2.3.2, 74 pages.
Shuai Wan et al:"[G-PCC] CE13.11 report on Intra occupancy prediction" 130. MPEG Meeting; Apr. 20, 2020-Apr. 24, 2020; Alpbach; (Motion Picture Expert Group or IsO/IEC JtC1/sc29/

(56) References Cited

OTHER PUBLICATIONS wG11), No. m53328, Apr. 16, 2020 (Apr. 16, 2020), XP030286573,[retrieved on Apr. 16, 2020], section 2, in particular p. 2, lines 1-4, 7 pages.
Supplementary European Search Report in the European application No. 20927585.8, mailed on Jan. 5, 2024, 13 pages.
First Office Action of the Indian application No. 202227039416, issued on Oct. 27, 2022.
Hearing Notice of the Indian application No. 202227039416, issued on Dec. 5, 2024, 3 pages with English translation.
Extended Hearing Notice of the Indian application No. 202227039416, issued on Dec. 27, 2024, 3 pages with English translation.

* cited by examiner

| Test sequence | Geometric BD-TotalRate (%) | |
|---|---|---|
| | D1 | D2 |
| basketball_player_vox11_00000200 | -1.9% | -1.9% |
| boxer_viewdep_vox12 | -1.5% | -1.5% |
| dancer_vox11_00000001 | -1.6% | -1.6% |
| longdress_viewdep_vox12 | -1.3% | -1.3% |
| longdress_vox10_1300 | -1.2% | -1.3% |
| loot_viewdep_vox12 | -1.5% | -1.5% |
| loot_vox10_1200 | -1.5% | -1.6% |
| queen_0200 | -1.4% | -1.5% |
| redandblack_viewdep_vox12 | -1.2% | -1.2% |
| redandblack_vox10_1550 | -1.2% | -1.2% |
| soldier_viewdep_vox12 | -1.2% | -1.2% |
| soldier_vox10_0690 | -1.1% | -1.1% |
| thaidancer_viewdep_vox12 | -1.5% | -1.5% |
| overall | -1.39% | -1.42% |

FIG. 8

| Test sequence | Geometric BD-TotalRate (%) |
|---|---|
| | D1 |
| basketball_player_vox11_00000200 | 98.4% |
| boxer_viewdep_vox12 | 96.9% |
| dancer_vox11_00000001 | 98.5% |
| longdress_viewdep_vox12 | 97.2% |
| longdress_vox10_1300 | 99.1% |
| loot_viewdep_vox12 | 97.1% |
| loot_vox10_1200 | 98.9% |
| queen_0200 | 99.3% |
| redandblack_viewdep_vox12 | 97.7% |
| redandblack_vox10_1550 | 99.1% |
| soldier_viewdep_vox12 | 97.5% |
| soldier_vox10_0690 | 99.1% |
| thaidancer_viewdep_vox12 | 98.6% |
| overall | 98.26% |

FIG. 9

METHODS FOR INTRA PREDICTION, AND ENCODER

CROSS-REFERENCE TO RELATED APPLICATION

This application is a continuation of U.S. application Ser. No. 17/857,789, filed on Jul. 5, 2022, which is a U.S. continuation application of International Application No. PCT/CN2020/070557, entitled "INTRA-FRAME PREDICTION METHOD AND APPARATUS, CODER, DECODER AND STORAGE MEDIUM", filed on Jan. 6, 2020. The contents of these applications are hereby incorporated by reference in their entirety.

TECHNICAL FIELD

The present disclosure relates to encoding and decoding technologies in the field of communications, and particularly to methods for intra prediction, and an encoder.

BACKGROUND

At present, in an intra prediction scheme for octree-based geometric information coding in a related art, occupancy information of 26 neighboring nodes of a present node (i.e., a coded node) and multiple preset thresholds are used for calculation and comparison.

SUMMARY

The present disclosure provides methods for intra prediction, and an encoder, which can improve the speed and accuracy of intra prediction during encoding and decoding processing and further improve the encoding and decoding quality.

The technical solutions of the embodiments of the present disclosure may be implemented as follows.

According to a first aspect, the present disclosure provides a method for intra prediction implemented by an encoder, which includes the following operations.

Intra prediction is enabled, and occupancy information of a first number of neighboring nodes of a coded node is determined.

Occupancy information of a second number of neighboring nodes of the coded node is determined based on a position association between at least one neighboring node of the coded node and a child node of the coded node, where the first number is greater than the second number.

An occupancy prediction result of the child node of the coded node is determined based on the occupancy information of the second number of neighboring nodes.

According to a second aspect, the present disclosure provides a method for intra prediction implemented by a decoder, which includes the following operations.

Intra prediction is enabled, and occupancy information of a first number of neighboring nodes of a coded node is determined.

Occupancy information of a second number of neighboring nodes of the coded node is determined based on a position association between at least one neighboring node of the coded node and a child node of the coded node, where the first number is greater than the second number.

An occupancy prediction result of the child node of the coded node is determined based on the occupancy information of the second number of neighboring nodes.

According to a third aspect, the present disclosure provides an encoder, which includes a memory and a processor.

The memory is configured to store instructions executable by the processor.

The processor is configured to execute the executable instructions stored in the memory to perform operations including:
  enabling intra prediction, and determining occupancy information of a first number of neighboring nodes of a coded node;
  determining occupancy information of a second number of neighboring nodes of the coded node based on a position association between at least one neighboring node of the coded node and a child node of the coded node, where the first number is greater than the second number; and
  determining an occupancy prediction result of the child node of the coded node based on the occupancy information of the second number of neighboring nodes.

BRIEF DESCRIPTION OF THE DRAWINGS

FIG. 8 shows a BD-Rate under lossy compression according to an embodiment of the present disclosure.

FIG. 9 shows a bpip ratio under lossless compression according to an embodiment of the present disclosure.

DETAILED DESCRIPTION

Figure 1:
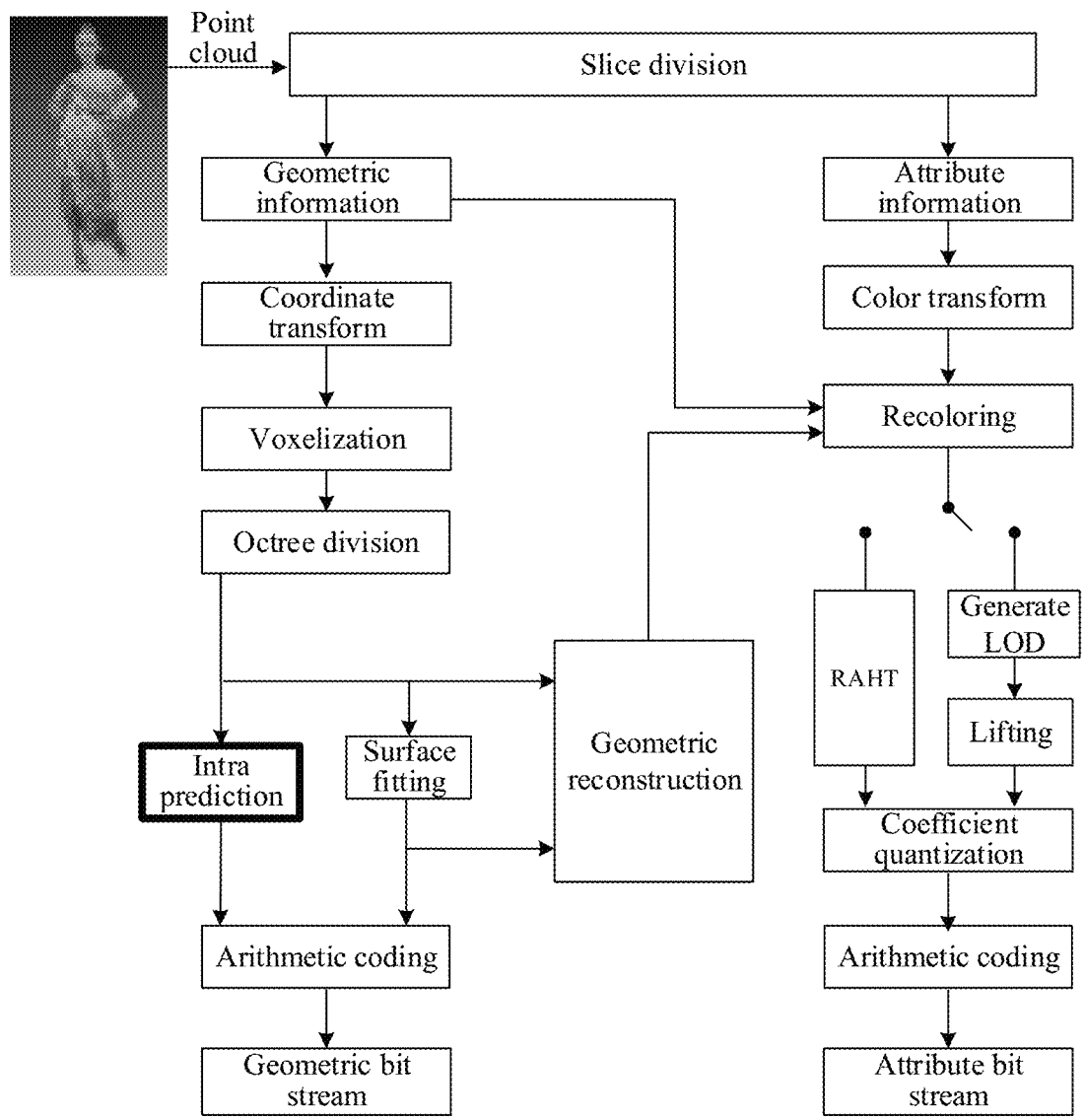
FIG. 1 is an exemplary flow block diagram of coding according to an embodiment of the present disclosure.

At present, in an intra prediction scheme for octree-based geometric information coding in a related art, occupancy information of 26 neighboring nodes of a present node (i.e., a coded node) and multiple preset thresholds are used for calculation and comparison. It is to be noted that, when the above-mentioned prediction scheme is used for intra prediction, more Look Up Tables (LUTs) are involved, and moreover, intra prediction at least involves the setting of 16 weights and 10 thresholds. As a result, it is hard to find an optimal solution, and furthermore, an intra prediction result may not be optimized. Thus, it can be seen that intra prediction in the related art has the problems of large calculation amount, relatively long encoding and decoding time, and inaccurate intra prediction result.

In order to make the objectives, technical solutions, and advantages of the embodiments of the present disclosure clearer, specific technical solutions of the present disclosure will further be described below in combination with the drawings in the embodiments of the present disclosure in detail. The following embodiments are used to describe the present disclosure rather than limit the scope of the present disclosure.

Unless otherwise defined, all technical and scientific terms used herein have the same meanings as commonly understood by those skilled in the art the present disclosure belongs to. Terms used herein are only for a purpose of describing the embodiments of the present disclosure and not intended to limit the present disclosure.

"Some embodiments" involved in the following descriptions describes a subset of all possible embodiments. However, it can be understood that "some embodiments" may be the same or different subsets of all the possible embodiments, and may be combined without conflicts.

It is to be pointed out that term "first/second/third" involved in the embodiments of the present disclosure is only for distinguishing similar objects and does not represent a specific sequence of the objects. It can be understood that "first/second/third" may be interchanged according to specific sequences or orders if allowed such that the embodiments of the present disclosure described herein may be implemented in a sequence other than those illustrated or described herein. A present node herein refers to a coded node.

Nouns and terms involved in the embodiments of the present disclosure will be described before the embodiments of the present disclosure are further described in detail. The nouns and terms involved in the embodiments of the present disclosure are suitable to be explained as follows.
1) Point Cloud Compression (PCC)
2) Geometry-based Point Cloud Compression (G-PCC)
3) Slice
4) Bounding box
5) Octree
6) Intra prediction
7) Triangle Soup (trisoup)
8) Context-based Adaptive Binary Arithmetic Coding (CABAC)
9) Block
10) Vertex
11) Red-Green-Blue (RGB)
12) Luminance-Chrominance (YUV)
13) Level of Detail (LOD)
14) Region Adaptive Hierarchical Transform (RAHT)
15) Look Up Table (LUT)
16) Moving Picture Experts Group (MPEG)
17) International Standardization Organization (ISO)
18) International Electrotechnical Commission (IEC)
19) Number of occupied neighbors (No) in neighboring nodes In the embodiments of the present disclosure, in a G-PCC encoder framework, after slice division is performed on a point cloud input to a Three-Dimensional (3D) image model, each slice is encoded independently.

In a flow block diagram of G-PCC encoding shown in FIG. 1, after the input point cloud is divided into slices, each of the slices is encoded independently. In each slice, geometric information of the point cloud and attribute information corresponding to each point are encoded separately.

First, coordinate transform is performed on the geometric information so as to include the whole point cloud in a bounding box. Then, quantization is performed. The quantization mainly implements scaling. Rounding in quantization makes the geometric information corresponding to a part of points the same. Whether to remove duplicate points is determined based on parameters. The process of quantization and removal of the duplicate points is also referred to as a voxelization process. Next, octree-based division is performed on the bounding box. The geometric information is encoded by two octree- and trisoup-based frameworks according to different depths of octree division levels.

In the octree-based geometric information coding framework, the bounding box is equally divided into eight sub-cubes, and occupancy information of each sub-cube is recorded (where 1 represents nonempty, and 0 represents empty). A nonempty sub-cube continues to be equally divided into eight parts. Division is stopped when a leaf node obtained by division is a 1×1×1 unit cube. In this process, intra prediction is performed on the occupancy information by use of a spatial correlation between a node and a surrounding node. Finally, CABAC is performed to generate a binary bitstream.

In the trisoup-based geometric information coding framework, octree-based division is also performed first. However, different from the octree-based geometric information coding, the trisoup-based geometric information coding does not need to divide the point cloud level by level into unit cubes with side lengths of 1×1×1, and instead, division is stopped when a side length of a block is W. Based on a surface formed by the distribution of a point cloud in each block, at most 12 vertexes generated by the surface and the 12 sides of the block are obtained. Vertex coordinates of each block are encoded sequentially to generate a binary bitstream.

The geometric information is reconstructed after geometry coding is completed. At present, attribute coding is performed mainly for color information. First, the color information is transformed from an RGB color space to a YUV color space. Then, the point cloud is recolored by use of the reconstructed geometric information so as to achieve a correspondence between the un-encoded attribute information and the reconstructed geometric information. There are mainly two transform methods for the encoding of the color information: one is distance-based lifting transform dependent on LOD division, and the other is direct RAHT. By both methods, the color information may be transformed from a space domain to a frequency domain. A high-frequency coefficient and a low-frequency coefficient are obtained by transform. Finally, the coefficients are quantized and encoded to generate a binary bitstream.

Here, intra prediction for octree-based geometric information coding is described.

Prediction, i.e., intra prediction, is performed on whether a child node of a present node (i.e., a coded node) is occupied according to occupancy information of 26 neighboring nodes of the present node. The implementation of intra prediction is described as follows.

First, intra prediction is enabled when a present level of octree division is lower than a preset level L. An input is a Morton 3D map for mapping an (x, y, z) coordinate and a flag bit, a map shift parameter, and a coordinate of an origin of the present node.

Then, a weight value $W(d_{k,m}, \delta_k)$ is set according to the occupancy information $\delta_k$ of a neighboring node k and a distance $d_{k,m}$ from the neighboring node k to the child node of the present node:

$$W(d_{k,m}, \delta_k) = \begin{cases} W0(d_{k,m}) & \text{if } \delta_k = 0 \\ W1(d_{k,m}) & \text{if } \delta_k = 1 \end{cases}.$$

Next, 26 weights are averaged to derive a corresponding score $score_m$:

$$score_m = \frac{1}{26}\sum\nolimits_{k=1}^{26} W(d_{k,m}, \delta_k).$$

Later on, two sets of thresholds $th_0(No)$ and $th_1(No)$ related to No (number of occupied neighbors) in the neighboring nodes are set. It is predicted that the node is "unoccupied" when $score_m$ is less than or equal to $th_0(No)$ and the node is "occupied" when $score_m$ is greater than or equal to $th_1(No)$. Otherwise, "skip prediction" is obtained.

Finally, "whether to perform prediction" and "predicted value" represented by 0 or 1 are output for subsequent entropy coding of occupancy information. Here, "1, 1" represents "occupied", "1, 0" represents "unoccupied", and "0, 0" represents "skip prediction".

Here, values of $W0(d_{k,m})$, $W1(d_{k,m})$, $th_0(No)$, and $th_1(No)$ are all obtained by training. They are preset fixed values in an encoder and a decoder, and need not to be transmitted by the encoder to the decoder. Processes, frameworks, and algorithms of the technical solution at the encoder and the decoder are completely the same.

It is to be noted that the technical solution of intra prediction for octree-based geometric information coding at least has the following defect. The occupancy information of the 26 neighboring nodes of the present node is used. "1" represents nonempty, and "0" represents empty. Then, calculation and comparison are performed according to the values of $W0(d_{k,m})$, $W1(d_{k,m})$, $th_0(No)$, and $th_1(No)$. Finally, three kinds of prediction results are obtained. In the solution, more LUTs are involved, and 16 weights and 10 thresholds are set. As a result, it is hard to find an optimal solution, and furthermore, an intra prediction result may not be optimized. In addition, considering that some neighboring nodes hardly affect a certain child node of the present node, prediction with all of the 26 neighbors brings excessive calculations, thereby prolonging the encoding and decoding time.

Figure 2:
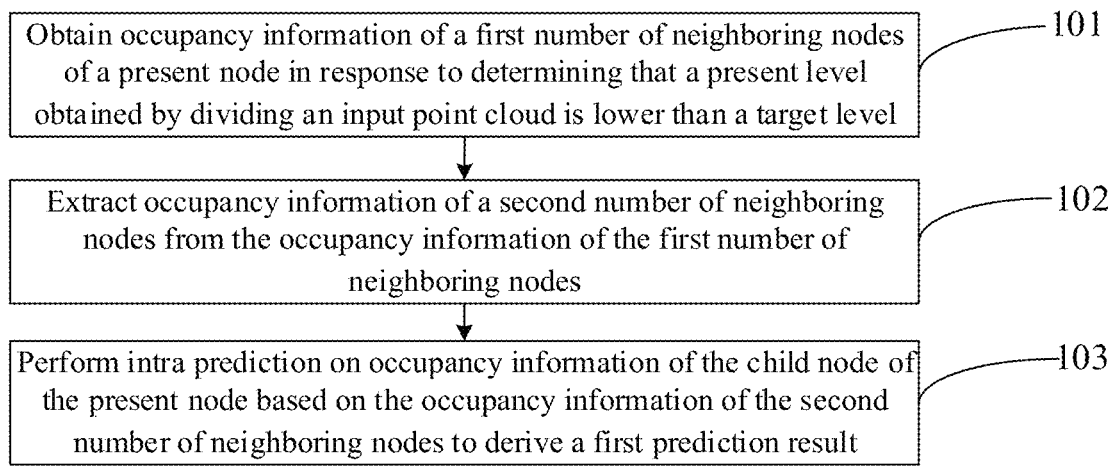
FIG. 2 is a first exemplary flowchart of an intra prediction method according to an embodiment of the present disclosure.

An embodiment of the present disclosure provides an intra prediction method. Referring to FIG. 2, the method includes the following operations.

In 101, occupancy information of a first number of neighboring nodes of a present node is obtained in response to determining that a present level obtained by dividing an input point cloud is lower than a target level.

In the embodiment of the present disclosure, an encoder or a decoder may execute the operations illustrated in 101 to 103 so as to derive a first prediction result of performing intra prediction on occupancy information of a child node of a present node (i.e., a coded node).

For example, the encoder executes the operations illustrated in 101 to 103. The encoder includes a 3D point cloud encoder, such as a G-PCC encoder. The G-PCC encoder, after dividing the input point cloud into slices, encodes each slice independently. Here, the encoder obtains occupancy information of the first number of neighboring nodes of the present node in response to determining that the present level obtained by dividing the input point cloud is lower than the target level. In some embodiments, the encoder may divide the input point cloud based on octree.

In 102, occupancy information of a second number of neighboring nodes is extracted from the occupancy information of the first number of neighboring nodes.

The first number is greater than the second number. The second number of neighboring nodes are in association with the child node of the present node.

In the embodiment of the present disclosure, the encoder, after obtaining the occupancy information of the first number of neighboring nodes of the present node, extracts the occupancy information of the second number of neighboring nodes from the occupancy information of the first number of neighboring nodes. It is to be noted that the second number of neighboring nodes are in association with the child node of the present node. That is, after the occupancy information of the first number of neighboring nodes of the present node is obtained, the occupancy information of the first number of neighboring nodes of the present node is screened first to determine occupancy information of neighboring nodes with certain influences on the child node of the present node, and the screened-out occupancy information is taken as a reference factor for intra prediction of the occupancy information of the child node of the present node. As such, calculations brought considering the occupancy information of all of the first number of neighboring nodes are reduced, and a foundation is laid for shortening the encoding and decoding time and improving the encoding and decoding efficiency and the encoding and decoding accuracy.

In 103, intra prediction is performed on occupancy information of a child node of the present node based on the occupancy information of the second number of neighboring nodes to derive a first prediction result.

In the embodiment of the present disclosure, the encoder, after screening out the occupancy information of the second number of neighboring nodes, performs intra prediction on occupancy information of the child node of the present node based on the occupancy information of the second number of neighboring nodes to derive a first prediction result.

According to the intra prediction method provided in the embodiment of the present disclosure, occupancy information of a first number of neighboring nodes of a present node is obtained in response to determining that a present level obtained by dividing an input point cloud is lower than a target level. The occupancy information of a second number of neighboring nodes is extracted from the occupancy information of the first number of neighboring nodes, the first number being greater than the second number, and the second number of neighboring nodes being in association with a child node of the present node. Intra prediction is performed on occupancy information of the child node of the present node based on the occupancy information of the second number of neighboring nodes to derive a first prediction result. That is, in the embodiments of the present disclosure, when intra prediction is performed on the occupancy information of the child node of the present node, only the second number of neighboring nodes in association with the child node of the present node are considered. Therefore, the aims of reducing LUTs and the calculation complexity, improving the accuracy of an intra prediction result, shortening the encoding and decoding time, and improving the encoding and decoding accuracy are fulfilled.

Figure 3:
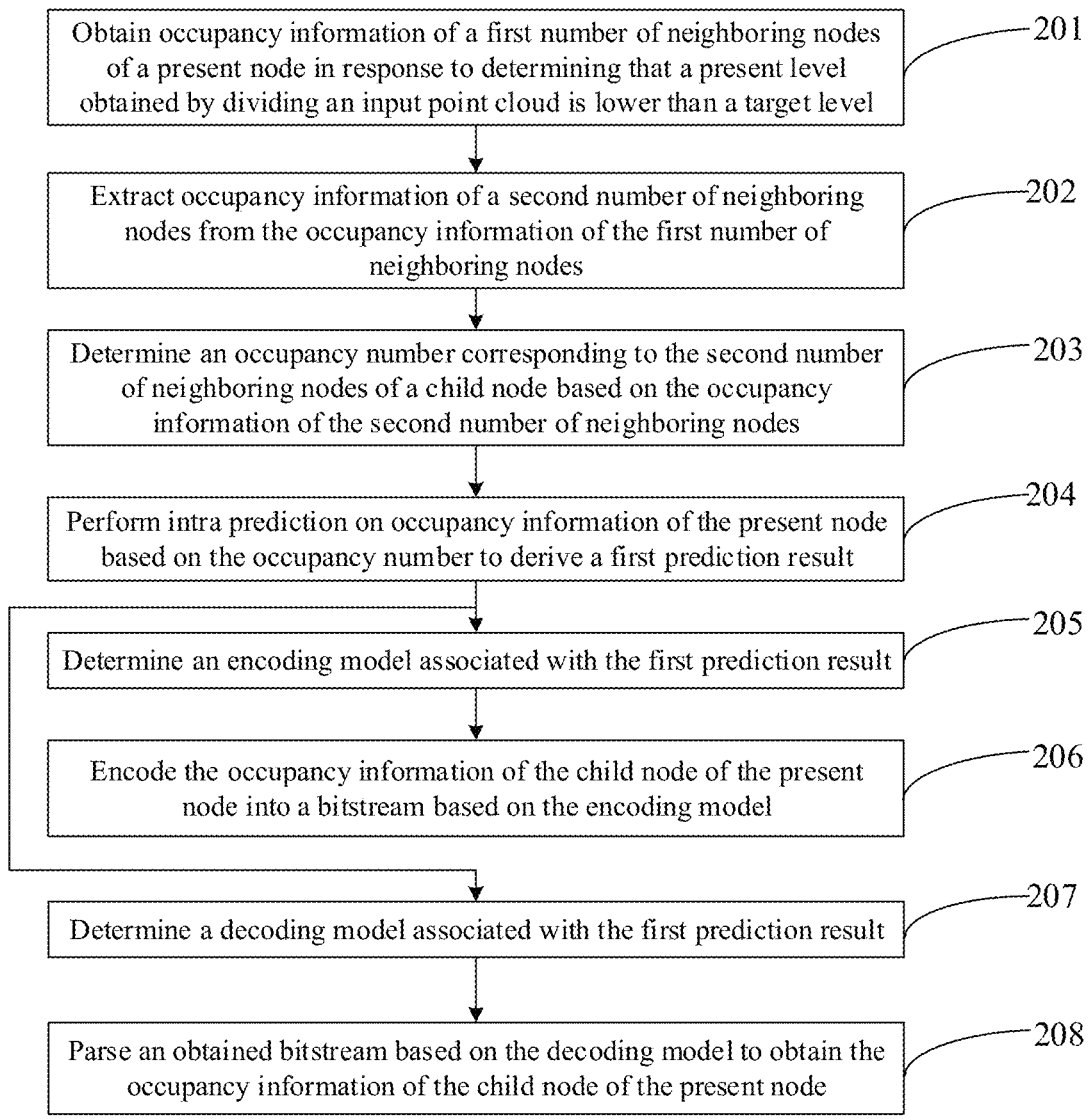
FIG. 3 is a second exemplary flowchart of an intra prediction method according to an embodiment of the present disclosure.

An embodiment of the present disclosure provides an intra prediction method. Referring to FIG. 3, it is to be noted that, when the intra prediction method is applied to an encoder, the method includes operations illustrated in 201 to 206. When the intra prediction method is applied to a decoder, the method includes operations illustrated in 201 to 204 and 207 to 208.

In some embodiments, the encoder includes a 3D point cloud encoder, and the decoder includes a 3D point cloud decoder.

In 201, occupancy information of a first number of neighboring nodes of a present node is obtained in response to determining that a present level obtained by dividing an input point cloud is lower than a target level.

In the embodiment of the present disclosure, the encoder or the decoder obtains occupancy information of a first number of neighboring nodes of a present node in response to determining that a present level L obtained by dividing an input point cloud is lower than a target level. Exemplarily, the encoder or the decoder obtains occupancy information $\delta(k)$ of the present node k according to the input point cloud, where k is valued to [0, 25], and $\delta$ is 0 or 1.

In 202, occupancy information of a second number of neighboring nodes is extracted from the occupancy information of the first number of neighboring nodes.

The first number is greater than the second number. The second number of neighboring nodes are in association with a child node of the present node. Here, the association includes the second number of neighboring nodes adjoin the child node of the present node by faces, edges, or corners.

In the embodiment of the present disclosure, the second number of neighboring nodes include neighboring nodes that adjoin the child node of the present node by faces, edges, or corners. Therefore, neighboring nodes hardly or slightly affecting a certain child node of the present node are screened out from the first number of neighboring nodes. As such, calculations are reduced, meanwhile, the encoding and decoding time is shortened effectively, and the encoding and decoding accuracy is ensured.

In 203, an occupancy number corresponding to the second number of neighboring nodes of the child node is determined based on the occupancy information of the second number of neighboring nodes.

In the embodiment of the present disclosure, the encoder or the decoder determines an occupancy number corresponding to the second number of neighboring nodes of the child node based on the occupancy information of the screened-out second number of neighboring nodes, to obtain $No_m$.

Exemplarily, for a child node m of the present node, occupancy information of seven neighbors thereof is considered, and a LUT $l_{m,n}$ is set to map numbers n of the seven neighbors to numbers k of 26 neighbors. Then, the number of occupied neighbors in the seven neighbors of the child node m is recorded.

Here, $No_m = \Sigma_{n=0}^{6} \delta(l_{m,n})$.

In 204, intra prediction is performed on occupancy information of the child node of the present node based on the occupancy number to derive a first prediction result.

The first prediction result indicates a prediction parameter about whether to perform prediction and a parameter indicating a predicted value in case of performing prediction.

In the embodiment of the present disclosure, the operation in 204 that intra prediction is performed on the occupancy information of the child node of the present node based on the occupancy number to derive the first prediction result may be implemented by the following operations.

In S204a, a third number associated with the second number is obtained.

In some embodiments, the third number may be equal to a half of the second number. Certainly, in another embodiment of the present disclosure, the third number may be determined flexibly based on the second number according to an actual situation.

Exemplarily, the third number may be 4 in case of considering seven neighboring nodes of the child node m.

In S204b, intra prediction is performed on the occupancy information of the child node of the present node based on the occupancy number and the third number to derive the first prediction result.

In some embodiments of the present disclosure, the operation in S204b that the intra prediction is performed on the occupancy information of the child node of the present node based on the occupancy number and the third number to derive the first prediction result includes the following operations.

In S204b1, intra prediction is performed, in response to determining that the occupancy number is different from the third number, on the occupancy information of the child node of the present node based on the occupancy number, a first threshold, and a second threshold to derive the first prediction result.

In the embodiment of the present disclosure, in case of $No_m \neq 4$, two sets of thresholds are set, including a first threshold $th_0$ and a second threshold $th_1$. It is predicted that the node is "unoccupied" when $No_m$ is less than or equal to $th_0$ and the node is "occupied" when $No_m$ is greater than or equal to $th_1$. Otherwise, "skip prediction" is obtained. It is to be noted that "occupied" indicates that the child node of the present node includes a point and "unoccupied" indicates that the child node of the present node does not include any point.

Further, when it is determined that the occupancy number is different from the third number, in an implementable scenario, the operation in S204b1 that the intra prediction is performed on the occupancy information of the child node of the present node based on the occupancy number, the first threshold, and the second threshold to derive the first prediction result may include the following operations.

In S11, the occupancy number is compared with the first threshold.

In S12, intra prediction is performed, in response to determining that the occupancy number is less than or equal to the first threshold, on the occupancy information of the child node of the present node to derive a first prediction result that the child node of the present node does not include any point.

Further, when it is determined that the occupancy number is different from the third number, in another implementable scenario, the operation that the intra prediction is performed on the occupancy information of the child node of the present node based on the occupancy number, the first threshold, and the second threshold to derive the first prediction result may include the following operations.

In S21, the occupancy number is compared with the second threshold.

In S22, intra prediction is performed, in response to determining that the occupancy number is greater than or equal to the second threshold, on the occupancy information of the child node of the present node to derive a first prediction result that the child node of the present node includes a point.

In another implementable scenario of the present disclosure, the occupancy number is compared with the first threshold, and a second prediction result that intra prediction is skipped for the occupancy information of the child node of the present node is obtained in response to determining that the occupancy number is greater than the first threshold and less than the second threshold.

In another embodiment of the present disclosure, the operation in S204b that intra prediction is performed on occupancy information of the child node of the present node based on the occupancy number and the third number to derive the first prediction result includes the following operation.

In S204b2, intra prediction is performed, in response to determining that the occupancy number is the same as the third number, on the occupancy information of the child node of the present node based on the occupancy number, a third threshold, and a fourth threshold to derive the first prediction result.

In the embodiment of the present disclosure, the operation in S204b2 that intra prediction is performed, in response to determining that the occupancy number is the same as the third number, on the occupancy information of the child node of the present node based on the occupancy number, the third threshold, and the fourth threshold to derive the first prediction result may include the following operations.

In S204b21, weights of the occupancy information of the second number of neighboring nodes are set according to distances from the second number of neighboring nodes of the child node to the child node in response to determining that the occupancy number is the same as the third number.

In S204b22, a value of a target parameter of the child node is determined based on the occupancy information of the second number of neighboring nodes and the weights corresponding to the occupancy information of the second number of neighboring nodes.

In S204b23, the first prediction result is determined based on the value of the target parameter, the third threshold, and the fourth threshold.

Further, in an implementable scenario, the operation in S204b23 that the first prediction result is determined based on the value of the target parameter, the third threshold, and the fourth threshold may include the following operation. Intra prediction is performed, in response to determining that the value of the target parameter is less than or equal to the third threshold, on the occupancy information of the child node of the present node to derive a first prediction result that the child node of the present node does not include any point.

In the embodiment of the present disclosure, when $No_m=4$, weights $w(d_{m,n})$ are set according to levels of distances $d_{m,n}$ from the seven neighbors of the present child node m to the present child node m, and a value of the target parameter $score_m$ is calculated according to $score_m = \sum_{n=0}^{6} \delta(l_{m,n}) \times w(d_{m,n})$.

Here, two sets of thresholds, i.e., a third threshold $th_2$ and a fourth threshold $th_3$ are set. It is predicted that the node is "unoccupied" when $score_m$ is less than or equal to $th_2$ and the node is "occupied" when $score_m$ is greater than or equal to $th_3$. Otherwise, "skip prediction" is obtained.

Figure 4:
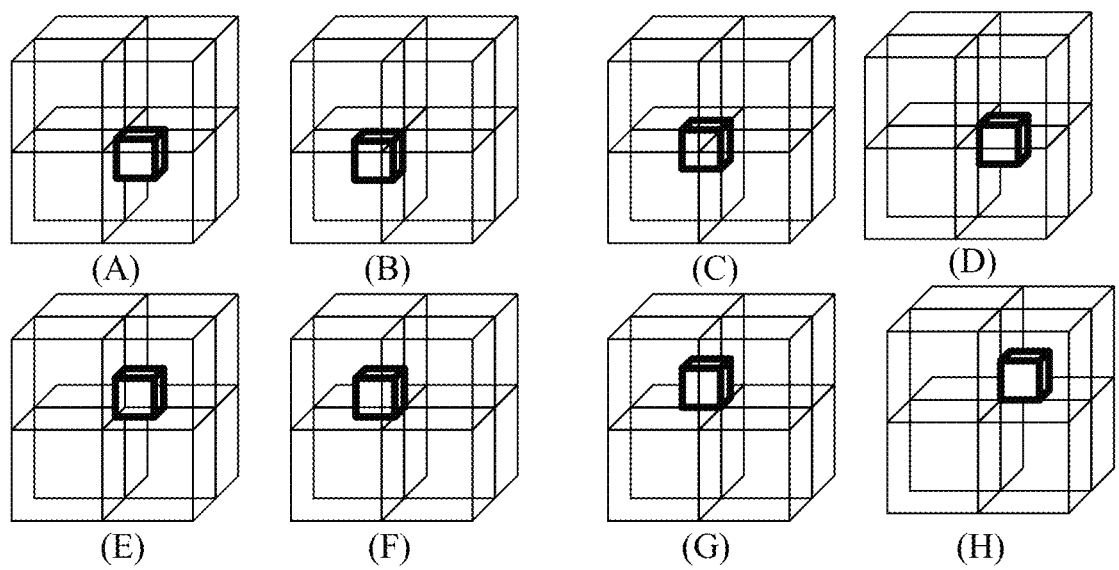
FIG. 4 is an exemplary schematic diagram that different child nodes of a present node include points according to an embodiment of the present disclosure.

Exemplarily, (A) to (H) in FIG. 4 represent occupancy conditions corresponding to different child nodes of the present node respectively, i.e., occupancy information of different child nodes of the present node.

Here, $l_{m,n}$ and $d_{m,n}$ are 8×7 LUTs. $w(d_{m,n})$, $th_0$, $th_1$, $th_2$, and $th_3$ are theoretical optimal values set according to the probability statistics and calculation of an encoding and decoding result of a training set, and they are preset fixed values in the encoder and the decoder, and need not to be transmitted by the encoder to the decoder.

In the embodiment of the present disclosure, exemplarily,

LUT_$l$[8][7]={{0,1,3,4,9,10,12},{1,2,4,5,10,11,13},
{3,4,6,7,12,14,15},{4,5,7,8,13,15,16},{9,10,12,
17,18,20,21},{10,11,13,18,19,21,22},{12,14,15,
20,21,23,24},{13,15,16,21,22,24,25}};

LUT_$d$[8][7]={{2,1,1,0,1,0,0},{1,2,0,1,0,1,0},{1,0,2,
1,0,1,0},{0,1,1,2,0,0,1},{1,0,0,2,1,1,0},{0,1,0,1,
2,0,1},{0,1,0,1,0,2,1},{0,0,1,0,1,1,2}}.

The setting of the weights $w(d_{m,n})$ needs to satisfy the condition that $score_m$ may be mapped to order-irrelevant combinations of $\delta(l_{m,n})$ and $w(d_{m,n})$ one to one. Taking w[3]={11, 7, 5} as an example, the thresholds are set as follows: $th_0=2$, $th_1=5$, $th_2=0$, and $th_3=40$.

Further, in another implementable scenario, the operation in S204b23 that the first prediction result is determined based on the value of the target parameter, the third threshold, and the fourth threshold may include the following operation. Intra prediction is performed, in response to determining that the value of the target parameter is greater than or equal to the fourth threshold, on the occupancy information of the child node of the present node to derive a first prediction result that the child node of the present node includes a point.

Further, in another implementable scenario, the operation in S204b23 that the first prediction result is determined based on the value of the target parameter, the third threshold, and the fourth threshold may include the following operation. A second prediction result that intra prediction is skipped for the occupancy information of the child node of the present node is obtained in response to determining that the value of the target parameter is greater than the third threshold and less than the fourth threshold.

In 205, an encoding model associated with the first prediction result is determined.

In the embodiment of the present disclosure, the encoder, after deriving the first prediction result, determines an encoding model associated with the first prediction result.

In 206, the occupancy information of the child node of the present node is encoded based on the encoding model and written to a bitstream.

In the embodiment of the present disclosure, the encoder encodes, based on the encoding model, and writes, to a bitstream, the occupancy information of the child node of the present node.

In 207, a decoding model associated with the first prediction result is determined.

In the embodiment of the present disclosure, the decoder, after obtaining the first prediction result, determines a decoding model associated with the first prediction result.

In 208, an obtained bitstream is parsed based on the decoding model to obtain the occupancy information of the child node of the present node.

In the embodiment of the present disclosure, the decoder parses an obtained bitstream based on the decoding model to obtain the occupancy information of the child node of the present node.

Figure 5:
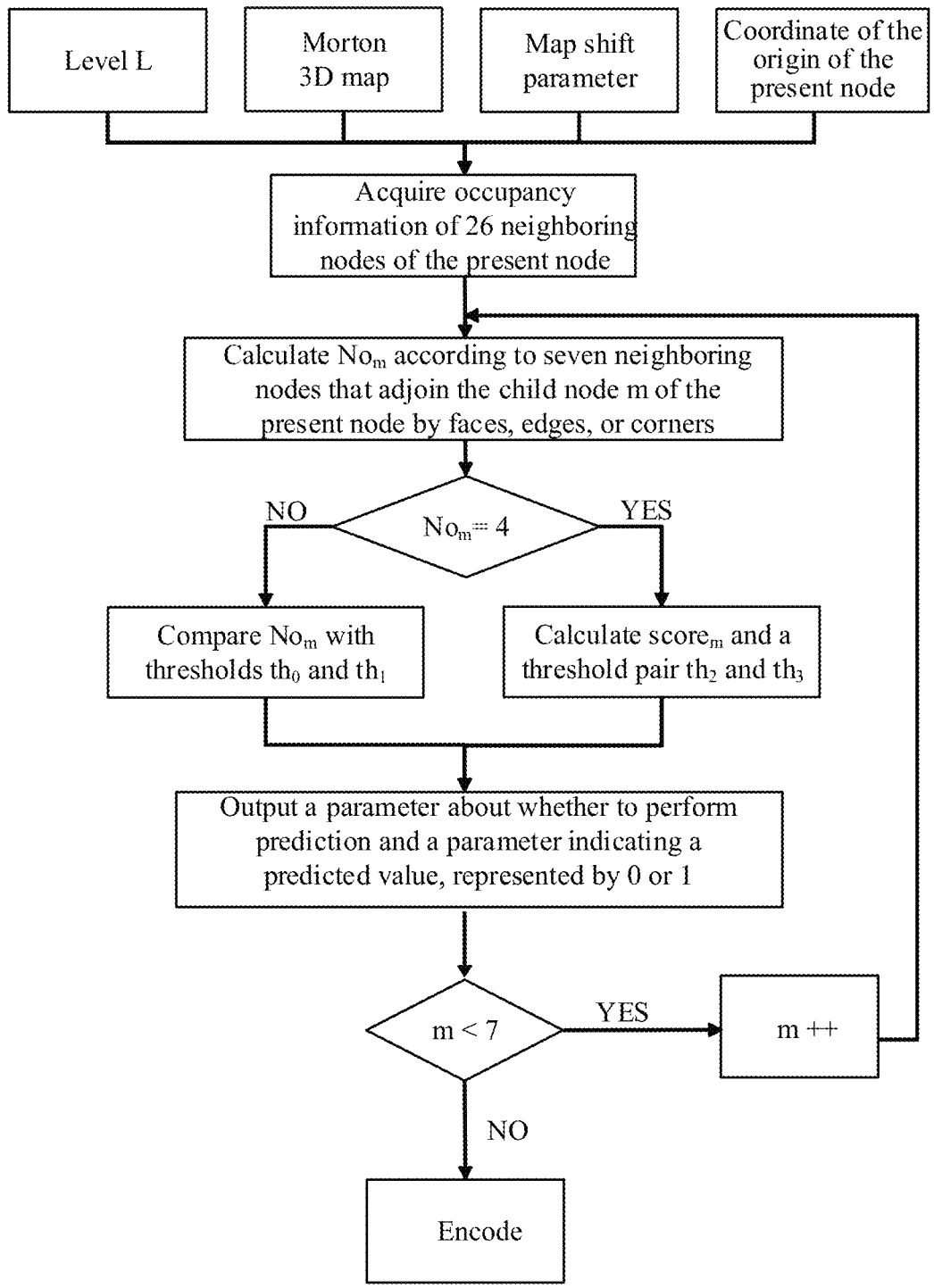
FIG. 5 is a schematic flowchart of an intra prediction method executed by an encoder according to an embodiment of the present disclosure.

In an implementable scenario, referring to FIG. 5, taking the intra prediction method being applied to the encoder as an example, the encoder, when predicting a certain child node of the present node, only considers influences of seven connected neighbor parent nodes that adjoin the child node by faces, edges, or corners. Then, three kinds of prediction results are obtained according to the calculation of weights and the setting of thresholds. The intra prediction method executed by the encoder includes the following operations.

At a first step, intra prediction is enabled when a present level L of octree division is lower than a preset level. An input is a Morton 3D map for mapping an (x, y, z) coordinate and a flag bit, a map shift parameter, and a coordinate of an origin of the present node.

At a second step, occupancy information $\delta(k)$ of a neighboring node k is obtained according to the input information, where k is valued to [0, 25], and $\delta$ is 0 or 1.

At a third step, for a child node m of the present node, occupancy information of seven neighbors thereof is considered only, and a LUT $l_{m,n}$ is set to map numbers n of the seven neighbors to numbers k of 26 neighbors. Then, the number of occupied neighbors in the seven neighbors of the child node m is recorded:

$$No_m = \Sigma_{n=0}^{6} \delta(l_{m,n}).$$

At a fourth step, when $No_m \neq 4$, two sets of thresholds $th_0$ and $th_1$ are set. It is predicted that the node is "unoccupied" when $No_m$ is less than or equal to $th_0$ and the node is "occupied" when $No_m$ is greater than or equal to $th_1$. Otherwise, "skip prediction" is obtained.

When $No_m = 4$, weights $w(d_{m,n})$ are set according to levels of distances $d_{m,n}$ between the seven neighbors of the present child node m and the present child node m, and calculation is performed as follows:

$$score_m = \Sigma_{n=0}^{6} \delta(l_{m,n}) \times w(d_{m,n}).$$

Two sets of thresholds $th_2$ and $th_3$ are set. It is predicted that the node is "unoccupied" when $score_m$ is less than or equal to $th_2$ and the node is "occupied" when $score_m$ is greater than or equal to $th_3$. Otherwise, "skip prediction" is obtained.

At a fifth step, "whether to perform prediction" and "predicted value" represented by 0 or 1 are output for subsequent entropy coding of occupancy information. Here, "1, 1" represents "occupied", "1, 0" represents "unoccupied", and "0, 0" represents "skip prediction".

It is to be noted that $l_{m,n}$ and $d_{m,n}$ are 8×7 LUTs. $w(d_{m,n})$, $th_0$, $th_1$, $th_2$, and $th_3$ are theoretical optimal values set according to the probability statistics and calculation of an encoding and decoding result of a training set, and they are preset fixed values in the encoder and the decoder, and need not to be transmitted by the encoder to the decoder. That is, the technical concepts of the intra prediction method provided in the present disclosure at the encoder side and the decoder side are the same. It can be understood that, except related operations for encoding at the encoder side and decoding at the decoder side, the operations for the intra prediction of the occupancy information of the child node of the present node are the same.

Exemplarily, in some embodiments,

LUT_l[8][7]={{0,1,3,4,9,10,12},{1,2,4,5,10,11,13}, {3,4,6,7,12,14,15},{4,5,7,8,13,15,16},{9,10,12, 17,18,20,21},{10,11,13,18,19,21,22},{12,14,15, 20,21,23,24},{13,15,16,21,22,24,25}};

LUT_d[8][7]={{2,1,1,0,1,0,0},{1,2,0,1,0,1,0},{1,0,2, 1,0,1,0},{0,1,1,2,0,0,1},{1,0,0,2,1,1,0},{0,1,0,1, 2,0,1},{0,1,0,1,0,2,1},{0,0,1,0,1,1,2}}.

The setting of the weight $w(d_{m,n})$ needs to satisfy the condition that $score_m$ may be mapped to order-irrelevant combinations of $\delta(l_{m,n})$ and $w(d_{m,n})$ one to one. Taking w[3]={11, 7, 5} as an example, the thresholds are set as follows: $th_0 = 2$, $th_1 = 5$, $th_2 = 0$, and $th_3 = 40$.

Further, the encoder determines an encoding model associated with the first prediction result, and encodes, based on the encoding model, and writes, to a bitstream, the occupancy information of the child node of the present node.

Figure 6:
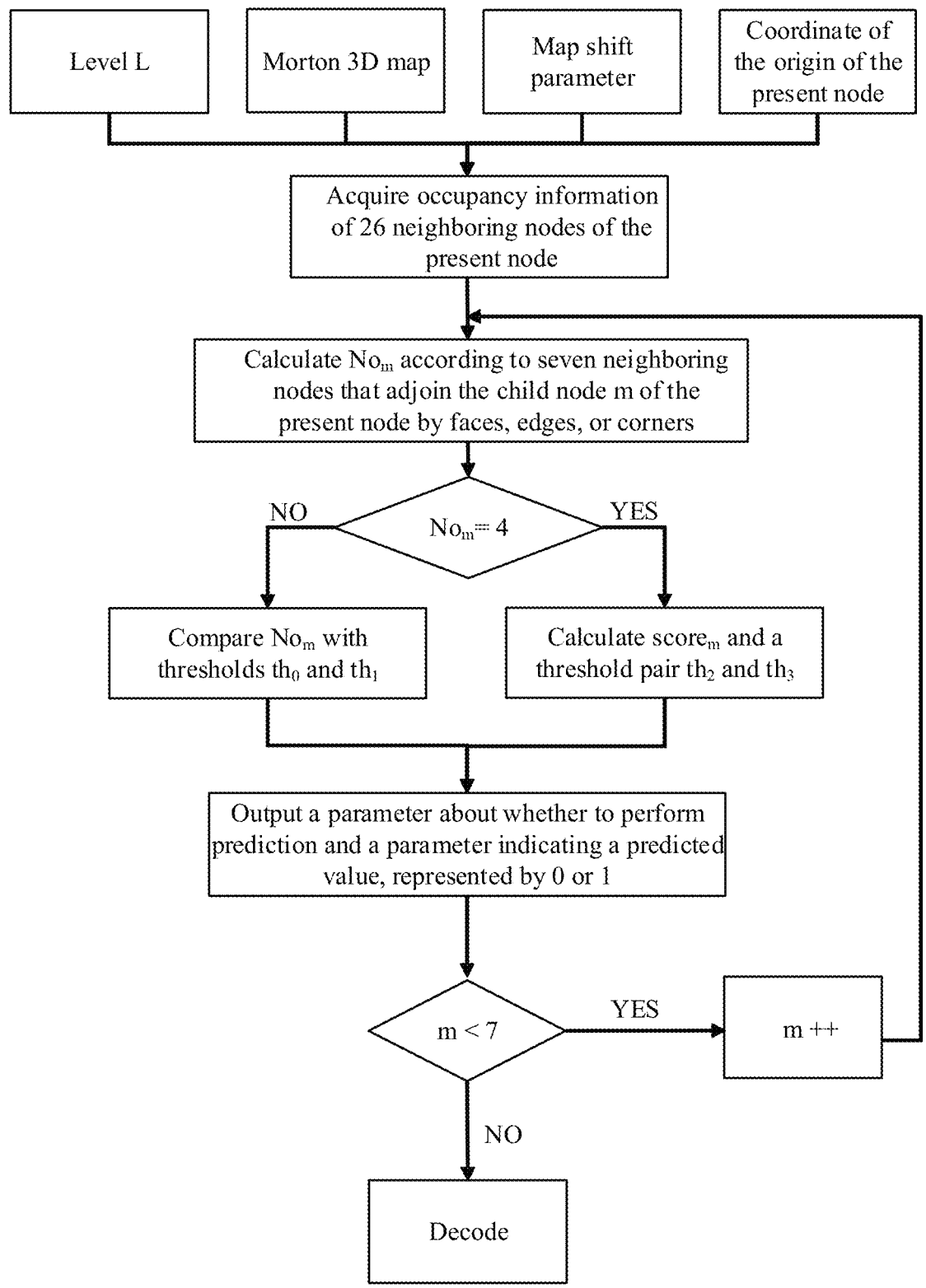
FIG. 6 is a schematic flowchart of an intra prediction method executed by a decoder according to an embodiment of the present disclosure.

In an implementable scenario, referring to FIG. 6, taking the intra prediction method being applied to the decoder as an example. The decoder, when predicting a certain child node of the present node, only considers influences of seven connected neighbor parent nodes that adjoin the child node by faces, edges, or corners. Then, three kinds of prediction results are obtained according to the calculation of weights and the setting of thresholds. The intra prediction method executed by the decoder includes the following operations.

At a first step, intra prediction is enabled when a present level L of octree division is lower than a preset level. An input is a Morton 3D map for mapping an (x, y, z) coordinate and a flag bit, a map shift parameter, and a coordinate of an origin of the present node.

At a second step, occupancy information $\delta(k)$ of a neighboring node k is obtained according to the input information, where k is valued to [0, 25], and 6 is 0 or 1.

At a third step, for a child node m of the present node, occupancy information of seven neighbors thereof is considered only, and a LUT $l_{m,n}$ is set to map numbers n of the seven neighbors to numbers k of 26 neighbors. Then, the number of occupied neighbors in the seven neighbors of the child node m is recorded:

$$No_m = \Sigma_{n=0}^{6} \delta(l_{m,n}).$$

At a fourth step, when $No_m \neq 4$, two sets of thresholds $th_0$ and $th_1$ are set. It is predicted that the node is "unoccupied" when $No_m$ is less than or equal to $th_0$ and the node is "occupied" when $No_m$ is greater than or equal to $th_1$. Otherwise, "skip prediction" is obtained.

When $No_m = 4$, weights $w(d_{m,n})$ are set according to levels of distances $d_{m,n}$ between the seven neighbors of the present child node m and the present child node m, and calculation is performed as follows:

$$score_m = \Sigma_{n=0}^{6} \delta(l_{m,n}) \times w(d_{m,n}).$$

Two sets of thresholds $th_2$ and $th_3$ are set. It is predicted that the node is "unoccupied" when $score_m$ is less than or equal to $th_2$ and the node is "occupied" when $score_m$ is greater than or equal to $th_3$. Otherwise, "skip prediction" is obtained.

At a fifth step, "whether to perform prediction" and "predicted value" represented by 0 or 1 are output for subsequent entropy coding of occupancy information. Here, "1, 1" represents "occupied", "1, 0" represents "unoccupied", and "0, 0" represents "skip prediction".

Further, the decoder determines a decoding model associated with the first prediction result, and parses an obtained bitstream based on the decoding model to obtain occupancy information of the child node of the present node.

It is to be noted that $l_{m,n}$ and $d_{m,n}$ are 8×7 LUTs. $w(d_{m,n})$, $th_0$, $th_1$, $th_2$, and $th_3$ are theoretical optimal values set according to the probability statistics and calculation of an encoding and decoding result of a training set, and they are preset fixed values in the encoder and the decoder, and need not to be transmitted by the encoder to the decoder. That is, the technical concepts of the intra prediction method provided in the present disclosure at the encoder side and the decoder side are the same. It can be understood that, except related operations for encoding at the encoder side and decoding at the decoder side, the operations for the intra prediction of the occupancy information of the child node of the present node are the same.

Exemplarily, in some embodiments,

LUT_l[8][7]={{0,1,3,4,9,10,12},{1,2,4,5,10,11,13}, {3,4,6,7,12,14,15},{4,5,7,8,13,15,16},{9,10,12, 17,18,20,21},{10,11,13,18,19,21,22},{12,14,15, 20,21,23,24},{13,15,16,21,22,24,25}};

LUT_d[8][7]={{2,1,1,0,1,0,0},{1,2,0,1,0,1,0},{1,0,2, 1,0,1,0},{0,1,1,2,0,0,1},{1,0,0,2,1,1,0},{0,1,0,1, 2,0,1},{0,1,0,1,0,2,1},{0,0,1,0,1,1,2}}.

The setting of the weight $w(d_{m,n})$ needs to satisfy the condition that $score_m$ may be mapped to order-irrelevant combinations of $\delta(l_{m,n})$ and $w(d_{m,n})$ one to one. Taking w[3]={11, 7, 5} as an example, the thresholds are set as follows: $th_0=2$, $th_1=5$, $th_2=0$, and $th_3=40$.

In another implementable scenario, taking the intra prediction method being applied to the encoder as an example, the above-mentioned intra prediction solution may further be simplified, thereby further reducing calculations for intra prediction. The intra prediction method executed by the encoder includes the following operations.

In this scenario, the calculation of $score_m$ and judgment in case of $No_m=4$ may be omitted, and meanwhile, the setting of the levels of distances $d_{m,n}$ and the weights $w(d_{m,n})$ may also be omitted. Therefore, the intra prediction method includes the following operations.

At a first step, intra prediction is enabled when a present level L of octree division is lower than a preset level. An input is a Morton 3D map for mapping an (x, y, z) coordinate and a flag bit, a map shift parameter, and a coordinate of an origin of the present node.

At a second step, occupancy information $\delta(k)$ of a neighboring node k is obtained according to the input information, where k is valued to [0, 25], and $\delta$ is 0 or 1.

At a third step, for a child node m of the present node, occupancy information of seven neighbors thereof is considered only, and a LUT $l_{m,n}$ is set to map numbers n of the seven neighbors to numbers k of 26 neighbors. Then, the number of occupied neighbors in the seven neighbors of the child node m is recorded:

$$No_m=\Sigma_{n=0}^6 \delta(l_{m,n}).$$

At a fourth step, two sets of thresholds $th_0$ and $th_1$ are set. It is predicted that the node is "unoccupied" when $No_m$ is less than or equal to $th_0$ and the node is "occupied" when $No_m$ is greater than or equal to $th_1$. Otherwise, "skip prediction" is obtained.

At a fifth step, "whether to perform prediction" and "predicted value" represented by 0 or 1 are output for subsequent entropy coding of occupancy information. Here, "1, 1" represents "occupied", "1, 0" represents "unoccupied", and "0, 0" represents "skip prediction".

It is to be noted that $l_{m,n}$ is an 8×7 LUT. $th_0$ and $th_1$ are theoretical optimal values set according to the probability statistics and calculation of an encoding and decoding result of a training set, and they are preset fixed values in the encoder and the decoder, and need not to be transmitted by the encoder to the decoder. That is, the technical concepts of the intra prediction method provided in the present disclosure at the encoder side and the decoder side are the same. It can be understood that, except related operations for encoding at the encoder side and decoding at the decoder side, the operations for the intra prediction of the occupancy information of the child node of the present node are the same.

Figure 7:
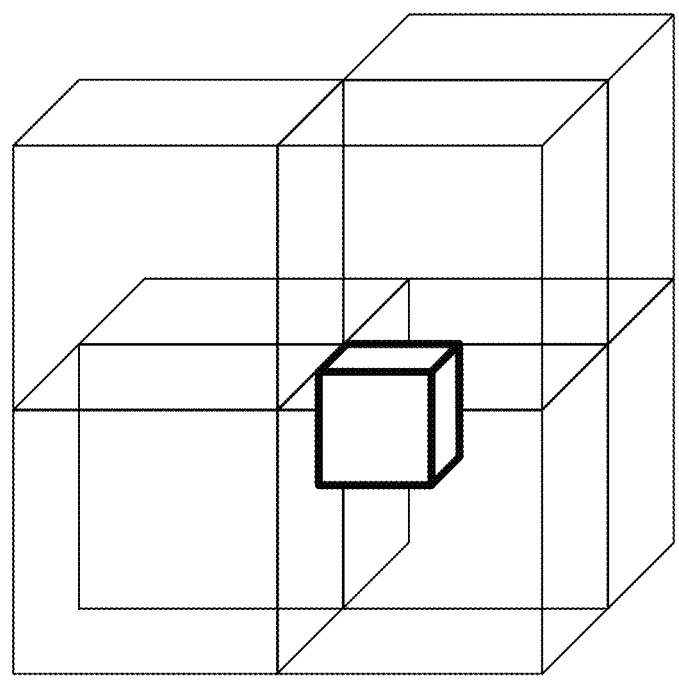
FIG. 7 is a schematic diagram that a certain child node of a present node includes a point according to an embodiment of the present disclosure.

In another implementable scenario, taking the intra prediction method being applied to the encoder as an example, any possible combination is selected from the seven neighbor parent nodes connected with the present child node to construct an intra prediction method based on occupancy information of N neighbor parent nodes connected with a present child node, where $N\in[1,7]$. Exemplarily, referring to FIG. 7, there are $C_7^6$ combinations when N=6. FIG. 7 is a schematic diagram of intra prediction based on occupancy information of six neighbor parent nodes. In this scenario, the intra prediction method executed by the encoder includes the following operations.

At a first step, intra prediction is enabled when a present level L of octree division is lower than a preset level. An input is a Morton 3D map for mapping an (x, y, z) coordinate and a flag bit, a map shift parameter, and a coordinate of an origin of the present node.

At a second step, occupancy information $\delta(k)$ of a neighboring node k is obtained according to the input information, where k is valued to [0, 25], and $\delta$ is 0 or 1.

At a third step, for a child node m of the present node, occupancy information of N neighbors thereof is considered only, and a LUT $l_{m,n}$ is set to map numbers n of the N neighbors to numbers k of 26 neighbors. Then, the number of occupied neighbors in the N neighbors of the child node m is recorded:

$$No_m=\Sigma_{n=0}^6 \delta(l_{m,n}).$$

At a fourth step, two sets of thresholds $th_0$ and $th_1$ are set. It is predicted that the node is "unoccupied" when $No_m$ is less than or equal to $th_0$ and the node is "occupied" when $No_m$ is greater than or equal to $th_1$. Otherwise, "skip prediction" is obtained.

At a fifth step, "whether to perform prediction" and "predicted value" represented by 0 or 1 are output for subsequent entropy coding of occupancy information. Here, "1, 1" represents "occupied", "1, 0" represents "unoccupied", and "0, 0" represents "skip prediction".

It is to be noted that $l_{m,n}$ is an 8×7 LUT. $th_0$ and $th_1$ are theoretical optimal values set according to the probability statistics and calculation of an encoding and decoding result of a training set, and they are preset fixed values in the encoder and the decoder, and need not to be transmitted by the encoder to the decoder. That is, the technical concepts of the intra prediction method provided in the present disclosure at the encoder side and the decoder side are the same. It can be understood that, except related operations for encoding at the encoder side and decoding at the decoder side, the operations for the intra prediction of the occupancy information of the child node of the present node are the same.

Based on the intra prediction method provided in the present disclosure, referring to FIG. 8, Table 1 shows what percentage of the code rate achieved by a PCC-based solution in the related art may be reduced under the same coding quality in case of lossy compression. Here, there are 13 test sequences. It can be seen from Table 1 that, when each test sequence is processed by the intra prediction method provided in the present disclosure, the bitstream may be reduced. Referring to FIG. 9, Table 2 shows a size of a compressed bitstream in case of lossless compression. It can be seen from Table 2 that all compressed bitstreams are less than 100%, and the bitstream may be obtained by using only part of the code rate in the related art.

The embodiment of the present disclosure may have the following beneficial effects. According to the situation of occupancy information of a child node of an encoded/decoded node in 26 neighboring nodes, when a certain child node of the present node is predicted, only influences of seven connected neighbor parent nodes that adjoin the child node by faces, edges, or corners are considered, thereby achieving the effect of reducing LUTs and the calculation complexity. In addition, simple weight and threshold setting makes it easy to find an optimal solution, and under the optimal weight and threshold setting, the technology achieves the effect of reducing the code rate with the Peak Signal to Noise Ratio (PSNR) remaining unchanged. Moreover, a spatial correlation of a point cloud is used more simply and accurately, so that an intra prediction result for octree-based geometric information coding is more suitable for the construction of a probability model in CABAC, and the binary bitstream is reduced.

Figure 10:
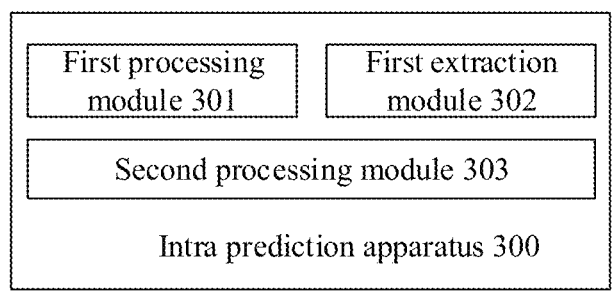
FIG. 10 is a structure diagram of an intra prediction apparatus according to an embodiment of the present disclosure.

FIG. 10 is a composition structure diagram of an intra prediction apparatus according to an embodiment of the present disclosure. As shown in FIG. 10, the intra prediction apparatus 300 includes a first processing module 301, a first extraction module 302, and a second processing module 303.

The first processing module 301 is configured to obtain occupancy information of a first number of neighboring nodes of a present node in response to determining that a present level obtained by dividing an input point cloud is lower than a target level.

The first extraction module 302 is configured to extract occupancy information of a second number of neighboring nodes from the occupancy information of the first number of neighboring nodes, the first number being greater than the second number, and the second number of neighboring nodes being in association with a child node of the present node.

The second processing module 303 is configured to perform intra prediction on occupancy information of the child node of the present node based on the occupancy information of the second number of neighboring nodes to derive a first prediction result.

In another embodiment, the association includes that the second number of neighboring nodes adjoin the child node of the present node by faces, edges, or corners.

In another embodiment, the second processing module 303 is configured to: determine an occupancy number corresponding to the second number of neighboring nodes of the child node is determined based on the occupancy information of the second number of neighboring nodes, and perform intra prediction on occupancy information of the child node of the present node based on the occupancy number to derive the first prediction result. The first prediction result indicates a prediction parameter about whether to perform prediction and a parameter indicating a predicted value in case of performing prediction.

In another embodiment, the second processing module 303 is configured to: obtain a third number associated with the second number, and perform intra prediction on occupancy information of the child node of the present node based on the occupancy number and the third number to derive the first prediction result.

In another embodiment, the second processing module 303 is configured to perform, in response to determining that the occupancy number is different from the third number, intra prediction on the occupancy information of the child node of the present node based on the occupancy number, a first threshold, and a second threshold to derive the first prediction result.

In another embodiment, the second processing module 303 is configured to: compare the occupancy number with the first threshold in response to determining that the occupancy number is different from the third number, and perform, in response to determining that the occupancy number is less than or equal to the first threshold, intra prediction on the occupancy information of the child node of the present node to derive a first prediction result that the child node of the present node does not include any point.

In another embodiment, the second processing module 303 is configured to perform, in response to determining that the occupancy number is greater than or equal to the second threshold, intra prediction on the occupancy information of the child node of the present node to derive a first prediction result that the child node of the present node includes a point.

In another embodiment, the second processing module 303 is configured to derive, in response to determining that the occupancy number is greater than the first threshold and less than the second threshold, a second prediction result that intra prediction is skipped for the occupancy information of the child node of the present node.

In another embodiment, the second processing module 303 is configured to perform, in response to determining that the occupancy number is the same as the third number, intra prediction on the occupancy information of the child node of the present node based on the occupancy number, a third threshold, and a fourth threshold to derive the first prediction result.

In another embodiment, the second processing module 303 is configured to: set weights of the occupancy information of the second number of neighboring nodes according to distances from the second number of neighboring nodes of the child node to the child node in response to determining that the occupancy number is the same as the third number; determine a value of a target parameter of the child node based on the occupancy information of the second number of neighboring nodes and the weights corresponding to the occupancy information of the second number of neighboring nodes; and determine the first prediction result based on the value of the target parameter, the third threshold, and the fourth threshold.

In another embodiment, the second processing module 303 is configured to perform, in response to determining that the value of the target parameter is less than or equal to the third threshold, intra prediction on the occupancy information of the child node of the present node to derive a first prediction result that the child node of the present node does not include any point.

In another embodiment, the second processing module 303 is configured to perform, in response to determining that the value of target parameter is greater than or equal to the fourth threshold, intra prediction on the occupancy information of the child node of the present node to derive a first prediction result that the child node of the present node includes a point.

In another embodiment, the second processing module 303 is configured to derive, in response to determining that the value of the target parameter is greater than the third threshold and less than the fourth threshold, a second prediction result that intra prediction is skipped for the occupancy information of the child node of the present node.

In another embodiment, the intra prediction apparatus is an encoding apparatus. The encoding apparatus further includes a first determination module and an encoding module. The first determination module is configured to determine an encoding model associated with the first prediction result.

The encoding module is configured to encode, based on the encoding model, and write, to a bitstream, the occupancy information of the child node of the present node.

In another embodiment, the intra prediction apparatus is a decoding apparatus. The decoding apparatus further includes a second determination module and a decoding module. The second determination module is configured to determine a decoding model associated with the first prediction result.

The decoding module is configured to parse an obtained bitstream based on the decoding model to obtain the occupancy information of the child node of the present node.

Figure 11:
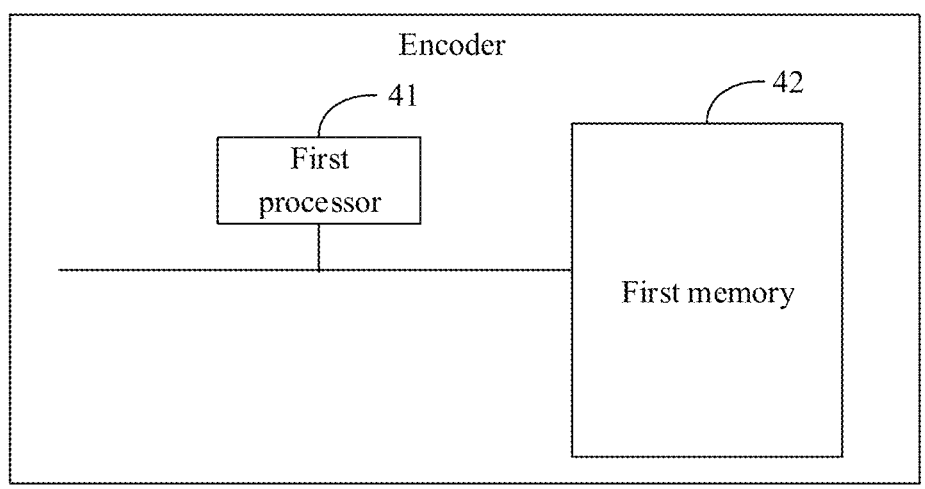
FIG. 11 is a structure diagram of an encoder according to an embodiment of the present disclosure.

In practical applications, as shown in FIG. 11, an embodiment of the present disclosure also provides an encoder, which includes a first memory 41 and a first processor 42.

The first memory 41 is configured to store executable instructions for intra prediction.

The first processor 42 is configured to execute the executable instructions for intra prediction stored in the first memory 41 to perform an intra prediction method for an encoding apparatus side in the embodiments of the present disclosure.

The processor may be implemented by software, hardware, firmware, or a combination thereof. The processor may execute the corresponding steps of the intra prediction method in the embodiment of the encoding apparatus by use of a circuit, one or more Application Specific Integrated Circuits (ASICs), one or more general-purpose integrated circuits, one or more microprocessors, one or more programmable logic devices, or a combination of the above-mentioned circuits or devices, or another proper circuit or device.

It can be understood that occupancy information of a first number of neighboring nodes of a present node is obtained in response to determining that a present level obtained by dividing an input point cloud is lower than a target level. The occupancy information of a second number of neighboring nodes is extracted from the occupancy information of the first number of neighboring nodes, the first number being greater than the second number, and the second number of neighboring nodes being in association with a child node of the present node. Intra prediction is performed on occupancy information of the child node of the present node based on the occupancy information of the second number of neighboring nodes to derive a first prediction result. That is, in the embodiments of the present disclosure, when intra prediction is performed on the occupancy information of the child node of the present node, only the second number of neighboring nodes in association with the child node of the present node are considered. Therefore, the aims of reducing LUTs and the calculation complexity, improving the accuracy of an intra prediction result, shortening the encoding and decoding time, and improving the encoding and decoding accuracy are fulfilled.

Figure 12:
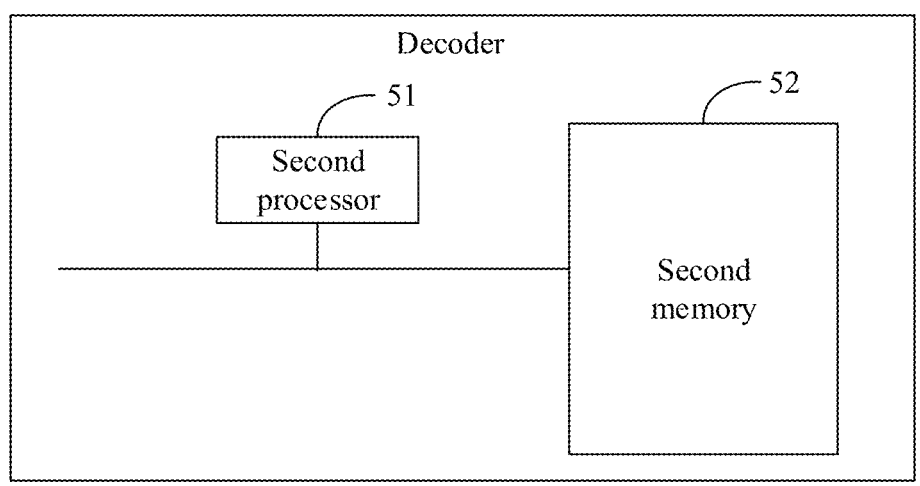
FIG. 12 is a structure diagram of a decoder according to an embodiment of the present disclosure.

In practical applications, as shown in FIG. 12, an embodiment of the present disclosure also provides a decoder, which includes a second memory 51 and a second processor 52.

The second memory 51 is configured to store executable instructions for intra prediction.

The second processor 52 is configured to execute the executable instructions for intra prediction stored in the second memory 51 to perform an intra prediction method for a decoding apparatus side in the embodiments of the present disclosure.

The processor may be implemented by software, hardware, firmware, or a combination thereof. The processor may execute the corresponding steps of the intra prediction method in the embodiment of the decoding apparatus by use of a circuit, one or more ASICs, one or more general-purpose integrated circuits, one or more microprocessors, one or more programmable logic devices, or a combination of the above-mentioned circuits or devices, or another proper circuit or device.

It can be understood that occupancy information of a first number of neighboring nodes of a present node is obtained in response to determining that a present level obtained by dividing an input point cloud is lower than a target level. The occupancy information of a second number of neighboring nodes is extracted from the occupancy information of the first number of neighboring nodes, the first number being greater than the second number, and the second number of neighboring nodes being in association with a child node of the present node. Intra prediction is performed on occupancy information of the child node of the present node based on the occupancy information of the second number of neighboring nodes to derive a first prediction result. That is, in the embodiments of the present disclosure, when intra prediction is performed on the occupancy information of the child node of the present node, only the second number of neighboring nodes in association with the child node of the present node are considered. Therefore, the aims of reducing LUTs and the calculation complexity, improving the accuracy of an intra prediction result, shortening the encoding and decoding time, and improving the encoding and decoding accuracy are fulfilled.

Each component in the embodiment of the disclosure may be integrated into a processing unit. Alternatively, each unit may physically exist independently. Alternatively, two or more than two units may be integrated into a unit. The integrated unit may be implemented in a hardware form, or in form of a software function module.

When being implemented in form of a software function module and sold or used not as an independent product, the integrated unit may be stored in a computer-readable storage medium. Based on such an understanding, the technical solution of the embodiment substantially or parts making contributions to the conventional art or all or part of the technical solution may be embodied in form of a software product. The computer software product is stored in a storage medium, including a plurality of instructions for enabling a computer device (which may be a personal computer, a server, a network device, or the like) or a processor to execute all or part of the steps of the method in the embodiment. The storage medium may include various media capable of storing program codes, such as a Ferromagnetic Random Access Memory (FRAM), a Read Only Memory (ROM), a Programmable ROM (PROM), an Erasable PROM (EPROM), an Electrically EPROM (EEPROM), a flash memory, a magnetic surface memory, a compact disc, or a Compact Disc Read-Only Memory (CD-ROM). No limits are made in the embodiment of the disclosure.

An embodiment of the present disclosure also provides a computer-readable storage medium, which stores executable instructions for intra prediction executed by a first processor to perform an intra prediction method for an encoder side in the embodiments of the present disclosure.

An embodiment of the present disclosure also provides a computer-readable storage medium, which stores executable instructions for intra prediction executed by a second processor to perform an intra prediction method for a decoder side in the embodiments of the present disclosure.

INDUSTRIAL APPLICABILITY

The embodiments of the present disclosure provide an intra prediction method and apparatus, an encoder, a decoder, and a storage medium. Occupancy information of a first number of neighboring nodes of a present node is obtained in response to determining that a present level obtained by dividing an input point cloud is lower than a target level. The occupancy information of a second number of neighboring nodes is extracted from the occupancy information of the first number of neighboring nodes, the first number being greater than the second number, and the second number of neighboring nodes being in association with a child node of the present node. Intra prediction is performed on occupancy information of the child node of the present node based on the occupancy information of the second number of neighboring nodes to derive a first prediction result. That is, in the embodiments of the present disclosure, when intra prediction is performed on the occupancy information of the child node of the present node, only the second number of neighboring nodes in association with the child node of the present node are considered. Therefore, the aims of reducing LUTs and the calculation complexity, improving the accuracy of an intra prediction result, shortening the encoding and decoding time, and improving the encoding and decoding accuracy are fulfilled.

The invention claimed is:

1. A method for intra prediction, implemented by an encoder, the method comprising:
   determining occupancy information of a first number of neighboring nodes of a coded node;
   determining occupancy information of a second number of neighboring nodes of the coded node based on a position association between at least one neighboring node of the coded node and a child node of the coded node, wherein the first number is greater than the second number;
   determining an occupancy number corresponding to the second number of neighboring nodes based on the occupancy information of the second number of neighboring nodes; and
   determining an occupancy prediction result of the child node of the coded node based on the occupancy number, comprising:
   setting two thresholds $th_0$ and $th_1$; and
   performing one of the following:
      determining, in response to determining that the occupancy number is less than or equal to the threshold $th_0$, the occupancy prediction result of the child node of the coded node is that the child node of the coded node does not comprise any point;
      determining, in response to determining that the occupancy number is greater than or equal to the threshold $th_1$, the occupancy prediction result of the child node of the coded node is that the child node of the coded node comprises a point; or
      determining, in response to determining that the occupancy number is greater than the threshold $th_0$ and less than the threshold $th_1$, the occupancy prediction result of the child node of the coded node is that intra prediction is skipped for occupancy information of the child node of the coded node.

2. The method of claim 1, wherein the position association comprises: the at least one neighboring node of the coded node adjoins the child node of the coded node by a face, an edge, or a corner.

3. The method of claim 1, wherein the method further comprises:
   determining an encoding model associated with the occupancy prediction result; and
   encoding occupancy information of the child node of the coded node into a bitstream based on the encoding model.

4. The method of claim 1, wherein the first number is 26 and the second number is 7.

5. A method for intra prediction, implemented by a decoder, the method comprising:
   determining occupancy information of a first number of neighboring nodes of a coded node;
   determining occupancy information of a second number of neighboring nodes of the coded node based on a position association between at least one neighboring node of the coded node and a child node of the coded node, wherein the first number is greater than the second number;
   determining an occupancy number corresponding to the second number of neighboring nodes based on the occupancy information of the second number of neighboring nodes; and
   determining an occupancy prediction result of the child node of the coded node based on the occupancy number, comprising:
   setting two thresholds $th_0$ and $th_1$; and
   performing one of the following:
      determining, in response to determining that the occupancy number is less than or equal to the threshold $th_0$, the occupancy prediction result of the child node of the coded node is that the child node of the coded node does not comprise any point;
      determining, in response to determining that the occupancy number is greater than or equal to the threshold $th_1$, the occupancy prediction result of the child node of the coded node is that the child node of the coded node comprises a point; or
      determining, in response to determining that the occupancy number is greater than the threshold $th_0$ and less than the threshold $th_1$, the occupancy prediction result of the child node of the coded node is that intra prediction is skipped for occupancy information of the child node of the coded node.

6. The method of claim 5, wherein the position association comprises: the at least one neighboring node of the coded node adjoins the child node of the coded node by a face, an edge, or a corner.

7. The method of claim 5, wherein the method further comprises:
   determining a decoding model associated with the occupancy prediction result; and
   parsing a bitstream based on the decoding model to obtain occupancy information of the child node of the coded node.

8. The method of claim 5, wherein the first number is 26 and the second number is 7.

9. A decoder, comprising:
   a processor; and
   a memory storing instructions executable by the processor,
   wherein the processor is configured to execute the instructions to perform operations comprising:
   determining occupancy information of a first number of neighboring nodes of a coded node;
   determining occupancy information of a second number of neighboring nodes of the coded node based on a position association between at least one neighboring node of the coded node and a child node of the coded node, wherein the first number is greater than the second number;
   determining an occupancy number corresponding to the second number of neighboring nodes based on the occupancy information of the second number of neighboring nodes; and
   determining the occupancy prediction result of the child node of the coded node based on the occupancy number, comprising:
   setting two thresholds $th_0$ and $th_1$; and
   performing one of the following:

determining, in response to determining that the occupancy number is less than or equal to the threshold $th_0$, the occupancy prediction result of the child node of the coded node is that the child node of the coded node does not comprise any point;

determining, in response to determining that the occupancy number is greater than or equal to the threshold $th_1$, the occupancy prediction result of the child node of the coded node is that the child node of the coded node comprises a point; or determining, in response to determining that the occupancy number is greater than the threshold $th_0$ and less than the threshold $th_1$, the occupancy prediction result of the child node of the coded node is that intra prediction is skipped for occupancy information of the child node of the coded node.

10. The decoder of claim 9, wherein the position association comprises: the at least one neighboring node of the coded node adjoins the child node of the coded node by a face, an edge, or a corner.

11. The decoder of claim 9, wherein the first number is 26 and the second number is 7.

\* \* \* \* \*